Figure 1:
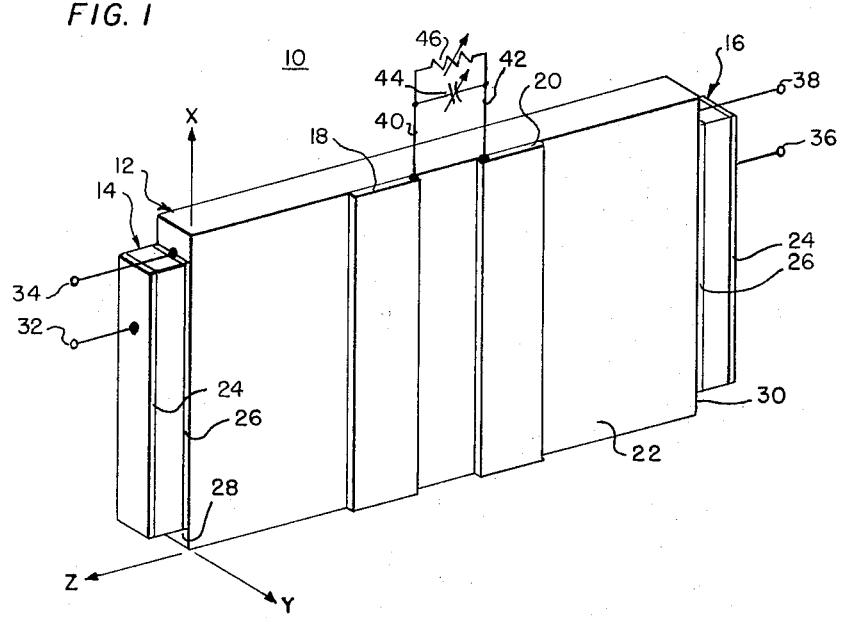

Nov. 15, 1966  A. D. BALLATO  3,286,205
VARIABLE DELAY LINE
Filed July 5, 1963

INVENTOR,
ARTHUR D. BALLATO.

BY Harry M. Saragovitz,
Edward J. Kelly,
Herbert Berl &
Julian C. Keppler
ATTORNEYS.

3,286,205
VARIABLE DELAY LINE
Arthur D. Ballato, Long Branch, N.J., assignor to the United States of America as represented by the Secretary of the Army
Filed July 5, 1963, Ser. No. 293,215
3 Claims. (Cl. 333—30)

The invention described herein may be manufactured and used by or for the Government for governmental purposes without the payment of any royalty thereon.

This invention relates to wave transmission and more particularly to signal delay lines.

Signal delay lines find a wide range of applications in numerous electronic arts. The purpose of a delay line is to reduce the velocity of signal propagation therein and thus delay signal transmission for a predetermined period of time.

A common form of delay line, frequently used to delay electrical signals in this manner, consists of a bar of solid acoustic transmitting material with electromechanical transducers at each end. In this type of device, the electrical signals to be delayed are impressed upon the input transducer, which converts them into mechanical vibrations in the nature of acoustic waves. These mechanical vibrations are, in turn, imparted to the solid transmitting medium, where the required delay occurs, and then picked up by the receiving transducer, which reconverts them into electrical impulses. However, this type of delay line introduces a fixed time delay, that is, for a given delay line the path length of the acoustic wave is fixed and constant, and the propagation velocity of the wave is also fixed and constant.

An object of this invention is to provide an electromechanical delay line with variable acoustic length.

Another object is to provide precise adjustment of the delay.

In accordance with this invention the delay line comprises a block of piezoelectric material having a pair of spaced electrodes disposed thereon. These electrodes are connected to a variable impedance network. The consequence of this arrangement of spaced electrodes and their associated network is to alter the velocity of the acoustic wave passing through the block, whereby the effective length of the block is varied.

The basic physical and crystallographic concept, on which the invention relies, is the effect due to the piezoelectric nature of the medium whereby the acoustic velocity varies by altering the effective elastic stiffness. In all piezoelectric material it is necessary to distinguish between the stiffnesses under two electrical conditions: constant electric field, and constant electric displacement. The effective stiffness depends upon the electric state of the material, and ranges between the above two conditions. Since the velocity of propagation of an acoustic wave is proportional to the square of the stiffness, the velocity may be altered by varying the electric conditions. This effect, though small, is sufficient for trimming the delay time in delay lines for many electric equipments, such as, storage devices in switching systems, in computers, in radar systems, and in long-distance telephone lines. Another way of visualizing this effect is to consider that the acoustic wave produces a traveling wave of electric charge due to the piezoelectric effect, and carries it along the path of propagation of the acoustic wave.

Figure 2:
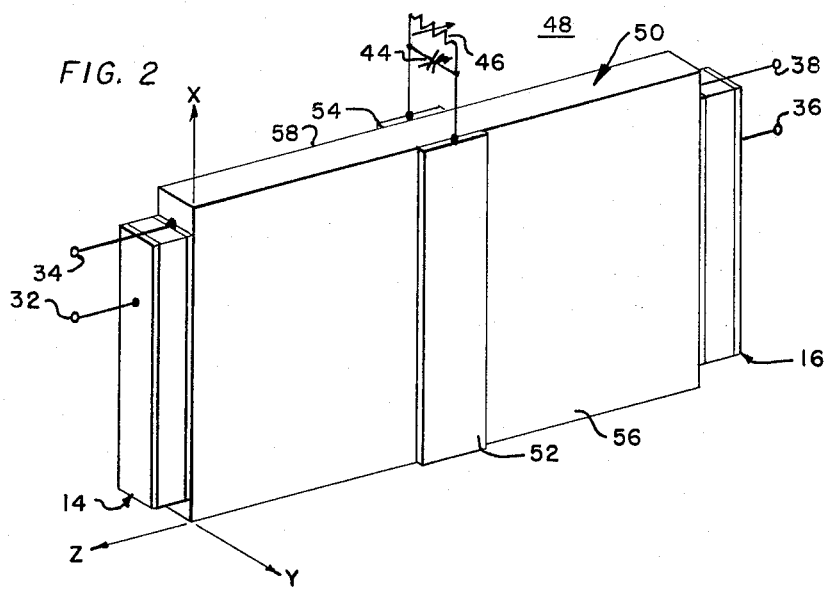

For a more detailed description of the invention, together with other and further objects thereof, reference is had to the following description taken in connection with the accompanying drawing, in which similar numerals designate similar elements and wherein:

FIG. 1 is a perspective view, partly schematic, of a delay line which includes a Y-cut alpha-quartz piezoelectric block provided with metallic electrodes in accordance with this invention; and FIG. 2 is a perspective view, partly schematic, of a piezoelectric crystal block similar to that of FIG. 1, provided with another form of metallic electrodes.

This specification follows the conventional terminology, as applied to piezoelectric crystalline substances, which employs a system of three orthogonal or mutually perpendicular X, Y and Z axes as reference axes for defining the angular orientation of a crystal element.

Referring to the drawing, FIG. 1 is a perspective view of a delay line 10 which includes a solid acoustic transmitting medium 12 having an input transducer 14, an output transducer 16, and a pair of spaced parallel electrodes 18 and 20 mounted on one surface of medium 12. The crystal medium 12 is in the form of a rectangular parallelepiped block of Y-cut alpha-quartz, which is cut so as to propagate therein X–Y shear mode acoustic vibrations.

As illustrated in the drawing, the discrete electrodes 18 and 20 are mounted on face 22, an X–Z surface of block 12 defined by the orthogonal axes X and Z. The dimensions of each of the electrodes 18 and 20 along the X-axis are of linear contour and are substantially parallel to the X-axis. These dimensions along the X-axis of block 12 extend substantially all the way across the X–Z surface of the block, as shown. The electrodes 18 and 20 are film-like metallic or other conductive coatings which may be applied in a conventional manner, such as by thermal evaporation or chemical deposition. The electrodes 18 and 20 are respectively connected to leads 40 and 42, which, in turn, are connected across a variable impedance network, consisting of a variable capacitor 44 and a variable resistance 46.

The transducers 14 and 16, may, for example, be made of quartz, and each has, respectively, an outer electrode 24 and an inner electrode 26. The respective inner electrodes 26 are secured to the opposite ends 28 and 30 of block 12, in a conventional manner. Delay line 10 has a pair of input terminals 32, 34 and a pair of output terminals 36, 38. Input terminal 32 is connected to the outer electrode 24 of input transducer 14; output terminal 36 is connected to the outer electrode of receiving transducer 16. The other terminals 34 and 38 are electrically connected to the inner electrodes 26, respectively, in a manner well known to workers in the art.

FIG. 2 shows another embodiment of the delay line in accordance with the invention. The delay line 48 comprises a block 50 identical in structure to block 12 of FIG. 1, differing, however, in that the electrodes 52 and 54 partially cover and are co-extensively disposed on respective opposite parallel faces 56 and 58, the X–Z surfaces of block 50. The dimensions of each of the electrodes 52 and 54 along the X-axis, have linear contour and are substantially parallel to the X-axis of block 50, and extend substantially all the way across the X–Z surfaces of the block.

In operation, the electrical signal to be delayed is applied to the input terminals 32, 34 and converted by the input transducer 14 into mechanical vibrations of the X–Y shear mode in the nature of an acoustic wave. After a certain delay time this wave reaches the output transducer 16 where it is reconverted into an output voltage appearing at the terminals 36, 38 to which a suitable load, not shown, may be connected. To vary the time delay the respective electrodes 18, 20 or 52, 54 of each delay line 10 or 48 are connected to the parallel network of capacitor 44 and resistor 46, and the values of these variable components are adjusted to a desired value to provide a precise adjustment of the delay time for the delay line, either 10 or 48, as the case may be.

In a delay line of the type disclosed in FIG. 1, the block 12 was made of alpha-quartz with dimensions and orientations substantially as follows; length (along Z-axis) 32 millimeters, width (along X-axis) 19 millimeters, thickness (along Y-axis) 2-millimeters. The transducers 14 and 16 were Y-cut quartz, resonant at approximately 974 kilocycles per second, which sent and received a mode predominately X-Y shear. The electrodes, 18 and 20 were in the form of strips each 2 millimeters wide, extended across the width of the block 12 on face 22, were spaced 3 millimeters apart, and were parallel to the X-axis. A delay of 8.20 microseconds was obtained with the electrodes 18 and 20 open-circuited. When capacitor 44 having an adjusted value of about 10 picofarads, and resistor 46 having an adjusted value of 1.5 ohms were connected in parallel across the electrodes 18 and 20, a delay of 8.21 microseconds was observed.

In a delay line of the type shown in FIG. 2, block 50 had the same dimensions and orientations as block 12 of FIG. 1. The parallel electrodes 52 and 54 were strips each 3 millimeters in width, and aligned parallel to the X-axis. When capacitor 44 adjusted to about 20 picofarads and resistor 46 adjusted to about 2 ohms were connected in parallel across electrodes 52 and 54, a delay of 8.22 microseconds was observed. This variation in delay time corresponds to 1 part in 410.

While there has been described what is at present considered to be the preferred embodiments of the invention, it will be obvious to those skilled in the art that various changes and modifications may be made therein without departing from the invention, and it is therefore aimed in the appended claims to cover all such changes and modifications as fall within the spirit and scope of the invention.

What is claimed is:

1. A signal delay line comprising a rectangular parallelepiped Y-cut block of alpha-quart crystal adapted to transmit in the X–Y shear mode, a pair of discrete electrodes mounted on at least one of the X–Z surfaces of said crystal, the dimensions of said electrodes along the X-axis of said crystal being substantially parallel to said X-axis and extending substantially all the way across said X–Z surface, and a variable impedance network connected across said electrodes for controlling the time delay of said delay line.

2. A signal delay line comprising a rectangular parallelepiped Y-cut block of alpha-quartz crystal adapted to transmit in the X–Y shear mode, a pair of discrete electrodes each partially covering both X–Z surfaces of said crystal, the areas on said X–Z surfaces covered by said electrodes being co-extensive, the dimensions of said electrodes along the X-axis of said crystal being substantially parallel to said X-axis and extending substantially all the way across said X–Z surfaces, and a variable impedance network connected across said electrodes for controlling the time delay of said delay line.

3. The invention as set forth in claim 2 and wherein the variable impedance network comprises a variable capacitor connected in parallel with a variable resistor.

No references cited.

HERMAN KARL SAALBACH, *Primary Examiner.*

E. LIEBERMAN, *Assistant Examiner.*